United States Patent [19]

Nishiura et al.

[11] Patent Number: 5,371,595
[45] Date of Patent: Dec. 6, 1994

[54] FIBER-OPTIC GYROSCOPE USING SINGLE BIREFRINGENT MATERIAL FOR DEPOLARIZER

[75] Inventors: Yozo Nishiura; Takaki Iwashita, both of Osaka, Japan

[73] Assignee: Sumitomo Electric Industries, Ltd., Osaka, Japan

[21] Appl. No.: 27,801

[22] Filed: Mar. 8, 1993

Related U.S. Application Data

[62] Division of Ser. No. 748,541, Aug. 22, 1991, Pat. No. 5,245,407.

Foreign Application Priority Data

Aug. 27, 1990 [JP] Japan ............................ 2-225616
Aug. 27, 1990 [JP] Japan ............................ 2-225617
Aug. 27, 1990 [JP] Japan ............................ 2-225618

[51] Int. Cl.⁵ ............................................ G01C 19/72
[52] U.S. Cl. ............................................ 356/350
[58] Field of Search ............................................ 356/350

[56] References Cited

U.S. PATENT DOCUMENTS

| | | | |
|---|---|---|---|
| 4,621,925 | 11/1986 | Masuda et al. | 356/350 |
| 4,828,389 | 5/1989 | Gubbins | 356/350 |
| 5,245,407 | 9/1993 | Nishiura et al. | 356/350 |

*Primary Examiner*—Samuel A. Turner
*Attorney, Agent, or Firm*—Cushman, Darby & Cushman

[57] ABSTRACT

A fiber-optic gyroscope having a depolarizer installed near the fiber coil and a polarizer disposed in the optical path before the light is divided in two partial lights to avoid the fluctuation of the light power passing reversely through the polarizer induced by the rotation of the polarization plane of the light. However, since the light emitting device emits a linearly polarized light, the light power first passing through the polarizer will fluctuate by the rotation of the polarization plane. This invention adds another depolarizer between the light emitting device and the polarizer in order to kill such a fluctuation.

10 Claims, 3 Drawing Sheets

FIBER-OPTIC GYROSCOPE USING SINGLE BIREFRINGENT MATERIAL FOR DEPOLARIZER

This is a division of Ser. No. 07/748,541, filed Aug. 22, 1991, now U.S. Pat. No. 5,245,407.

FIELD OF THE INVENTION

This invention relates to a fiber-optic gyroscope for measuring angular velocities of automobiles, airplanes, ships or other moving objects, especially to a phase modulated fiber-optic gyroscope.

BACKGROUND OF THE INVENTION

A fiber-optic gyroscope is a measurement device for measuring an angular velocity by utilizing the principle that the phase difference between two light waves which have propagated clockwise and counterclockwise in a fiber coil is in proportion to the angular velocity of the fiber coil. "Phase modulation" means that the phase of the light waves propagating in the optical fiber is modulated by expanding and shrinking a part of the optical fiber near an end of the fiber coil. The two lights—clockwise light and counterclockwise light—interfere with each other at an input surface of a photodetector. The modulation angular frequency is denoted by $\Omega$. The intensity of the interference light which is detected by the photodetector includes an infinite series of a fundamental signal of a first order of modulation and harmonics of higher orders of modulation having oscillating parts of the frequency of $n\Omega$ (n: integer) and coefficients of Bessel functions.

Thus, the fundamental signal or arbitrary order of harmonics will be obtained by phase-sensitively detecting the output signal of the photodetector using carrier signals of the modulation frequency or of the modulation frequency multiplied by an integer. The amplitude of the odd number order harmonic components (including the basic signal) in the photodetector signal is written by $$2E_1 E_2 J_{2m+1}(\zeta) \sin \Delta\theta \quad (1)$$

where $E_1$ and $E_2$ are amplitudes of the clockwise light and the counterclockwise light, $J_{2m+1}(\zeta)$ is a Bessel function of the $(2m+1)$ order, and $\Delta\theta$ is the phase difference between the clockwise propagating light and the counterclockwise propagating light. "$\zeta$" which designates the intensity of modulation is given by, $$\zeta = 2b \sin(\Omega L n/2c) \quad (2)$$

where b is the amplitude of the phase of modulation, $\Omega$ is the angular frequency of modulation, L is the length of the fiber coil, n is a refractive index of the optical fiber and c is a velocity of light in vacuum.

The amplitude of the second order harmonic component is written by, $$2E_1 E_2 J_{2n}(\zeta) \cos \Delta\theta \quad (3)$$

where $J_{2n}(\zeta)$ is a Bessel function of the 2n-th order. All harmonics include time phase difference $\Delta\theta$. The harmonics of even number order include $\cos \Delta\theta$, while the harmonics of odd number order include $\sin \Delta\theta$. If time amplitude of the light and the strength of modulation are stable enough, the phase difference $\Delta\theta$ will be obtained from the fundamental wave component alone.

In order to keep the modulation strength $\zeta$ a constant value, the driving circuit for the phase modulator should be controlled so as to keep the amplitude of pertinent odd number harmonic component to be zero. Thus, $\zeta$ is fixed to the zero point $\zeta_0$, if the 2n-th order of Bessel function; $J_{2n}(\zeta_0) = 0$. If the modulation strength $\zeta$ is constant, all the Bessel functions included in the series of the output signal are constant, known values.

If the amplitudes of the clockwise or counterclockwise propagating lights vary with time, the phase difference $\Delta\theta$ will be obtained as a tangential form $\tan \Delta\theta$ by dividing the fundamental component by the fourth harmonic component or another even number harmonic component. Since the amplitudes of the lights have cancelled away by the division, the result includes no component varying with time.

Then the accurate phase difference $\Delta\theta$ can be obtained by the three components; the basic wave component, the second order harmonic component and the fourth order harmonic component. Such phase modulated fiber-optic gyroscopes have been proposed by Japanese Patent Applications No. 1-57634, No. 1-57635, No. 1-57636, No. 1-57637, No. 1-291628, No. 1-291629, No. 1-291630, No. 1-291631, No. 1-295500, No. 2-3809, and No. 2-10055.

Since a fiber-optic gyroscope measures an angular velocity from the phase difference $\Delta\theta$ between the clockwise propagating light and the counterclockwise propagating light by having them interfere, the polarization planes of the two lights must be the same. Here, a "polarization plane" is defined as a plane which includes the polarization vectors of light waves. Thus, the polarization plane is in parallel with both the direction of electric field and the direction of propagation of light.

If the polarization planes were different, the intensity of the interference light would decrease in proportion to cosine of the angle held by the two polarization planes. Furthermore, if the polarization planes met at a right angle, the two lights could not interfere at all.

Thus, the polarization planes of the clockwise propagating light and the counterclockwise propagating light must be coincident in order to obtain the intensity signal of the interference light. Since a single-mode optical fiber permits two degenerate lights with different polarization planes to propagate with the same phase constant therethrough, the polarization planes are likely to rotate spontaneously. If the polarization planes varied in a fiber coil made from a single mode optical fiber, the intensity of interference light would irregularly change in proportion to cosine of the angle between the polarization planes of the two lights. A single mode fiber cannot forbid the polarization planes of light from rotating spontaneously. "Single mode" means that the fiber permits a light of a certain phase constant to propagate therethrough. But polarization of light is another physical property of light. The lights with the same phase constant include two different lights with different polarization planes. The diameter of the core of an optical fiber determines the number of lights which can propagate through it by restricting the phase constants of the lights. This "single mode" surely means a single light regarding the phase constant. But as a single mode fiber has a small, rotationally symmetric core, two lights with different polarization planes can propagate through it with the same phase constant. Since the two lights have the same phase constant, the two lights would mix together in a single mode fiber, if the polarization plane of a light rotated spontaneously.

Instead of the single mode fiber, a polarization maintaining single mode optical fiber which has recently been manufactured can also keep a polarization plane of light, because the degeneracy regarding the polarization is solved in the fiber. It is a kind of single mode fibers. Briefly, it is called a polarization maintaining fiber. The core of the polarization maintaining fiber has anisotropy around the optical axis. The diameters or the stresses of the core are different in two directions vertical to the center axis. The two directions are called here optical principal axes. Thus, if a light is introduced in a polarization maintaining fiber, the phase constant will split into two values according to the direction of the polarization planes. The polarization plane of a light is kept to be either of the two optical principal axes in the fiber because of the induced difference of the phase constants.

Thus, such an improvement of fiber-optic gyroscopes would be proposed that almost all optical paths should be constructed by polarization maintaining fibers instead of single mode fibers and the light should be converted into a linearly-polarized light by a polarizer before it was splitted into two partial lights by a beam splitter. Since the polarization planes of the partial lights would be maintained in coincidence with two vertical principal optical axes and no rotation of the polarization planes would occur, the clockwise propagating light or the counterclockwise propagating light would completely interfere because of the coincidence of the polarization planes. Thus, the fiber-optic gyroscope using the polarization maintaining fibers would be an excellent improvement.

However, such an improved fiber-optic gyroscope has never produced yet in spite of the theoretical advantages. It would be far expensive because a polarization maintaining fiber is still more expensive than a simple single mode fiber.

After all, a fiber coil and most other optical paths should preferably be constituted by simple single mode fibers. However, single mode fibers have some difficulties which have been partially described.

Although it is called a single mode fiber, it means that one mode only about the phase constant stands in the fiber. In practice, there are two modes of light with different polarization planes. Two modes of light with different polarization planes would be independent in an ideal case. However, two modes of light are likely to mix together, when the polarization planes rotate by some reason, because two modes have the same phase constant in macroscopic scale.

Furthermore, two modes with different polarization planes have not the same effective length of light paths, even when two modes have propagated by the same length, because the microscopic fluctuations of the light paths are different.

Thus, if two modes with different polarization planes were allowed to propagate in a fiber coil, the clockwise transmitted light and the counterclockwise transmitted light which have different effective lengths of light paths would interfere together. Then, the interference light would include an offset deriving from the difference of the effective lengths. Here, an "offset" means a deviation of the phase difference $\Delta\theta$ from 0 when the angular velocity $\Omega_0$ of a fiber coil is 0. It is a matter of course that two modes bear the offset, because of the effective differences of the optical paths.

The clockwise propagating light and the counterclockwise propagating light must experience entirely the same optical path for suppressing the offset. For this purpose, it would be preferable that the polarization plane of the light should be fixed to a certain direction by propagating through a polarizer before the light is divided by a beam splitter or an optical fiber coupler. If the polarization plane is fixed, only one mode with the determined polarization plane will propagate in a single mode fiber of a fiber coil. Then, the effective length of the optical paths will be rigorously the same. The situation is similar to the case of the mentioned polarization maintaining fiber up to here.

However, since the polarization plane of light is likely to rotate in a single mode optical fiber, the fixation of the polarization by a polarizer is not sufficient to obtain a maximum output without fluctuation of amplitude of light.

The light linearly-polarized by a polarizer is splitted into two lights by a beam splitter. The two lights propagate clockwise or counterclockwise through the fiber coil. Then, two lights meet together at the beam splitter or at the fiber coupler and pass through the polarizer in the inverse direction. At the moment, the polarization planes of the two clockwise and counterclockwise propagating lights do not necessarily coincide with the principal axis of the polarizer owing to probable rotation of the polarization planes in the single mode fiber of the fiber coil.

A deviation angle between the principal axis of the polarizer and the polarization plane of a light is denoted by $\phi$. If $\phi$ is not 0, the amplitude of the light penetrating through the polarizer decreases in proportion to $\cos\phi$. The angles $\phi$ for the clockwise light and for the counterclockwise light are not the same. Furthermore, the deviation angles $\phi$ will change with temperature. Thus, the amplitudes of the clockwise light and the counterclockwise light (for simplicity, "propagating" will be often omitted in the clockwise or counterclockwise propagating light) would vary at a photodetector. Thus, the output of the photodetector would also fluctuate owing to the rotation of the polarization planes of the lights.

Therefore, it was found that a depolarizer should be used in addition to the polarizer, if the fiber coil was constituted by a single mode optical fiber. A depolarizer is an optical device which converts a linearly-polarized light into a non-polarized light. Here, a non-polarized light means ensemble of partial lights with polarization planes distributed uniformly in all directions. Namely, although all the partial lights have different polarization planes, the vector sum of the polarization planes is always zero. Thus, the light has no effective polarization plane as a whole. The action of the depolarizer is reverse to that of the polarizer.

Such a fiber-optic gyroscope equipped with a depolarizer was proposed by, K. Boehm et al.: "Low-Drift Fiber Gyro Using a Superluminescent Diode", ELECTRONICS LETTERS. vol. 17, No.10, p352 (1981).

FIG. 2 shows the schematical view of the fiber-optic gyroscope proposed by K. Boehm.

The light emitted from a light emitting device (1) passes through a lens (21), a beam splitter (22), a polarizer (23) and a lens (24) and enters one end of an optical fiber (25). The lenses (21) and (24) make the light enter the narrow core of the optical fiber (25) by converging the light emitted with a wide solid angle from the light emitting device (1). Since the polarizer (23) is positioned between the lenses (21) and (24), the light entering the optical fiber (25) is linearly polarized. Namely, a single mode of light with one polarization plane enters the optical fiber (25). The linearly-polarized light propagates all the optical devices in the gyroscope. The optical fiber (25) couples with another optical fiber (27) by an optical fiber coupler (26). The optical fiber coupler (26) divides the incident linearly polarized light into two lights which will propagate clockwise or counterclockwise through a fiber coil (4). The clockwise light once goes out in the air, passes through a lens (28), a depolarizer (29) and another lens (30). The depolarized light is converged by the lens (30) at one end of a single mode fiber of the fiber coil (4). The light entering the optical fiber propagates clockwise through the fiber coil (4) and passes through a phase modulator (5).

On the other hand, the counterclockwise light enters another optical fiber (27), passes through the phase modulator (5) and propagates counterclockwise through the fiber coil (4). Then, the counterclockwise light passes through the depolarizer (29). The depolarizer (29) converts a linearly-polarized light into a nonpolarized light to the contrary of the action of a polarizer. The depolarizer is called a Lyot depolarizer which has two transparent birefringent crystals with rectangular optical axes for ordinary and extraordinary rays that are glued together so as to settle the angle between two optical axes of the transparent crystals to be 45 degrees. The thicknesses of the optical crystals are in a ratio of 1:2.

Both of two crystals have so large thickness that the difference of the optical paths between the ordinary ray and the extraordinary ray is longer than the coherent length of the light emitting device (1). Thus, a thinner depolarizer requires such a light emitting device with a shorter coherent length of light. Here, some terms are briefly explained. Coherent light is an ideal light which should have the waves with a common phase relation extending unlimitedly in space and in time. Two lights with a common phase can interfere together. Thus, two lights which are coherent together can interfere. In general, gas lasers have good coherency. Coherent length is the maximum length within which the waves of a light have a common phase relation. Birefringence means that the refractive index depends on the polarization plane of light. A uniaxial birefringence crystal has two principal axes which are perpendicular together. A ray with a polarization plane parallel with one of the principal axes is called an extraordinary ray. The other ray with a polarization plane parallel with the other of the principal axes is called an ordinary ray. The refractive index is different for the ordinary ray and the extraordinary ray. Since an optical path is defined as the product of the refractive index and the path length, the difference of the optical paths is the product of the path length (thickness of crystal) and the difference of the refractive indexes.

The fiber-optic gyroscope shown in FIG. 2 which had a fiber coil constituted by a single mode fiber had solved the problem of the drift of the output power caused by the spontaneous rotation of the polarization plane by using a polarizer and a depolarizer.

Boehm et al. proposed another fiber-optic gyroscope shown in FIG. 3. The light emitted from a light emitting device (1) passes through a cylindrical lens (33), a lens (34) and another lens (35), and convergently enters an optical fiber (36). Another fiber (32) communicating with a photodetector (6) is coupled with the optical fiber (36) by a coupler (37). The light going out from the optical fiber (36) passes a lens (38), a polarizer (39) and a lens (40). The light is now linearly polarized. The polarized light convergently enters another fiber (41). The light is divided by a coupler (42) into two partial lights; clockwise, counterclockwise propagating lights.

The clockwise light goes out in the air from the fiber (43). The light passes through a lens (45), a crystal depolarizer (Lyot depolarizer) and a lens (47). The light is now depolarized. The depolarized light convergently enters a single mode fiber and propagates through a fiber coil (4) clockwise. The clockwise propagating light is then phase-modulated by a phase modulator (5). The modulated clockwise light passes through the coupler (42) and the polarizer (39) in a reverse direction. Then, the light passes through the coupler (37) and enters the photodetector (6).

The counterclockwise light passes through the fiber coupler (42) and the phase modulator (5). The modulated counterclockwise light propagates through the fiber coil (4) counterclockwise. The light passes through the depolarizer (46), the fiber coupler (42), the polarizer (39) and the coupler (37). The light enters the photodetector (6). Thus, the clockwise light and the counterclockwise light interfere on the surface of the photodetector. The intensity of the interference light is detected.

Both the fiber-optic gyroscopes shown in FIG. 2 and in FIG. 3 fix the polarization plane to a unique plane at first, divide the light into two lights and depolarize the light. Since the clockwise light and the counterclockwise light are phase-modulated at different times, the effect of the phase-modulation is not cancelled and is included in the output signal of the photodetector. The output signal will be phase-sensitively detected by a lock-in-amplifier with the modulation signal. The method for modulation and demodulation of the signal is similar to the conventional phase modulated fiber-optic gyroscopes without depolarizer.

In these improvements, the lights once polarized are depolarized by a depolarizer and then polarized again. As mentioned before, the amplitude of the light passing through a polarizer is in proportion to cosine of the deviation angle held between the principal axis of the polarizer and the polarization plane of the light. Even if the polarization planes of partial lights spontaneously or inducedly rotated in the fiber coil, half of the partial light energy could pass through the polarizer, because the rotation of the polarization planes would happen to all the partial lights with the same probability and the partial lights would have the polarization planes distributed in all directions with the same probability.

Therefore, the problem of the drift or the decrease of the output signal owing to the probable rotation of the polarization planes was solved by the improvements.

However, the gyroscopes shown in FIG. 2 and FIG. 3 had another difficulty. They were not practical, compact devices but unpractical, bulky devices elaborately built up in a laboratory. The gyroscopes included discrete, bulky optical parts for depolarizers and polarizers which were constituted by optically active single crystals. The polarizers and depolarizers were far larger than optical fibers. Furthermore, bulky lenses must be positioned in front of and behind the polarizers or depolarizers, because the lights must pass through them as plane waves. These discrete optical parts made the gyroscopes very bulky and large.

For practical use, fiber-optic gyroscopes must be small, weightless devices. In order to make such a practical, small, weightless fiber-optic gyroscope, it is strongly desired that a depolarizer and polarizer should be made only of optical fibers.

It is well-known that a depolarizer and a polarizer can be made of optical fibers. A practical fiber-optic gyroscope would not be obtained before the optical parts could be made only of optical fibers. Besides the depolarizer and polarizer, such a beam splitter with a prism is similarly undesirable for a compact gyroscope. The bulky beam splitter should be replaced by an optical fiber coupler.

The replacement of the beam splitter by an optical fiber coupler leads to the version shown in FIG. 3. Would it be enough to replace the bulky, discrete optical components, depolarizer (46) and polarizer (39), by the equivalent parts constituted by optical fibers for obtaining a practical, compact fiber-optic gyroscope? It is not sufficient. Perhaps the reason why such a simple replacement would be insufficient has been noticed by this inventors for the first time. The reason will now be explained.

Although the light just emitted from the light emitting device (1) is linearly polarized in a certain direction determined by the geometric shape of the light emitting device (1), the polarization plane may rotate spontaneously or inducedly in a single mode optical fiber before the polarizer. Although the intermediate fiber (36) is short, it is difficult to harmonize the polarization plane of the light emitted from the light emitting device (1) with the principal axis of the polarizer. If the polarization plane did not coincide with the principal axis of the polarizer, the amplitude of the light which can pass through the polarizer would decrease.

In the case of using a discrete polarizer of a bulk crystal as shown in FIG. 2 or FIG. 3, it is possible to adjust the direction of the polarizer by rotating it so as to maximize the output power of the photodetector. However, in the case of using a fiber type polarizer, it is impossible to adjust the principal axis of a fiber type polarizer, because a light can be transmitted through the fiber type polarizer after it has been coupled with the single mode fibers. The coupling between the fiber type polarizer and the other fiber is done by melting and fitting their ends. If the fiber type polarizer is connected to the other fibers, the relative rotation therebetween is strictly forbidden.

Rotation of the light emitting device (1) may enable us to harmonize the polarization plane with the principal axis of the fiber type polarizer. If so, time polarization plane sometimes would rotate in a single mode fibers in front of and behind the fiber type polarizer spontaneously or inducedly by the change of temperature, the stress or the magnetic field. Such rotation would reduce the light power passing through the polarizer and would change the scale factor which is a ratio between an input variable and an output signal.

As described before, the problem of the rotation of the polarization plane of light in the single mode fibers between the fiber type polarizer and the fiber coil has successfully been solved by inserting a depolarizer at a point in the vicinity of the fiber coil. However, the inventors think another problem of the rotation of the polarization plane in the single mode fibers between the light emitting device and the polarizer has never been anticipated nor solved yet.

SUMMARY OF THE INVENTION

The purpose of the present invention is to provide a fiber-optic gyroscope. Another purpose of the invention is to provide a fiber-optic gyroscope which is completely immune from the drift or change of the output power induced by the rotation of the polarization plane in a single mode fiber.

To solve the difficulty of the probable rotation of the polarization plane between the light emitting device and the polarizer, the fiber-optic gyroscope of this invention has another depolarizer at a point of optical paths between the light emitting device and the polarizer. The newly-equipped depolarizer will depolarize the light which is emitted from the light emitting device, although the light is linearly polarized, half of the light energy can pass through the polarizer, because the light is depolarized just before the polarizer. The newly-proposed depolarizer decreases the light energy passing through the polarizer to about half of the initial value. However, the light energy passing through the polarizer will not change even if the polarization plane rotates between the light emitting device and the polarizer. Thus, the newly-equipped depolarizer solves the problem of the drift of the output signal induced by the rotation of the polarization plane.

The depolarizer can be positioned either between the light emitting device and the first fiber coupler or between the first fiber coupler and the polarizer. The newly-proposed depolarizer is called a first depolarizer to distinguish from the depolarizer which is positioned near the fiber coil.

Any types of depolarizer are applicable to the first depolarizer of this invention. Here, three types will be now explained.

An all-fiber type depolarizer consists of two polarization maintaining fibers which have been connected together with their optical principal axes deviating by 45 degrees. The ratio of the lengths of the two fibers is preferably 1:2. Even in the shorter polarization maintaining fiber, the optical path difference by birefringence should be longer than the coherent length of the light emitting device. Although the principle of depolarization is the same as Lyot depolarizer, the all-fiber type depolarizer requires no bulk crystals.

Another depolarizer consists only of a polarization maintaining fiber aligned in a special disposition with the light emitting device. Making use of the property that the light emitted from the light emitting device is linearly polarized, the depolarizer dispenses one polarization maintaining fiber. The single polarization maintaining fiber should be disposed in front of the light emitting device at one end. The other end of the polarization maintaining fiber has been connected to a single mode fiber communicating with the polarizer. What is important is that the principal axis of the polarization maintaining fiber deviates by 45 degrees from the polarization plane of the light emitting device. The polarization of the light emitting device and the birefringence of the polarization maintaining fiber constitute an effective depolarizer. Similarly, the length of the polarization maintaining fiber should be determined to satisfy the requirement that the optical path difference by birefringence should be longer than the coherent length of the light emitting device. The requirement kills the possibility of interference between two lights with the polarization planes perpendicular together.

Another depolarizer is a Lyot depolarizer which consists of two birefringent crystals with their principal axes deviating each other by 45 degrees. This depolarizer should be positioned between the light emitting device and the beginning end of a fiber, being accompanied with lenses.

The function of the present invention is now explained. In this invention, a depolarizer is inserted into the optical paths between the light emitting device and the polarizer. The linearly polarized light is converted by the depolarizer to a depolarized light. Since the depolarized light passes through the polarizer, the intensity of the output light is constant; half of the input light in energy. If the polarization planes of lights rotated in the single mode fiber between the depolarizer and the polarizer, the property of the depolarization would not be lost, because the rotation would occur in all directions with a common probability.

Since the intensity of the light passing through the polarizer becomes constant by the depolarizer, the precise angular alignment between the light emitting device and the optical fiber or between the optical fiber and the polarizer is unnecessary. Furthermore, any stress applied to the fiber or any change of temperature induces no change or drift of the intensity of the output light. The scale factor which is the ratio of an output signal to an input variable is stable, because the intensity of the light passing through the polarizer is constant. Thus, the depolarizer enables us to measure an angular velocity with high accuracy without drift. This invention will provide a fiber-optic gyroscope with a stable scale factor without drift in which almost all optical paths are constituted by optical fiber.

DETAILED DESCRIPTION OF THE EMBODIMENTS

Figure 1:
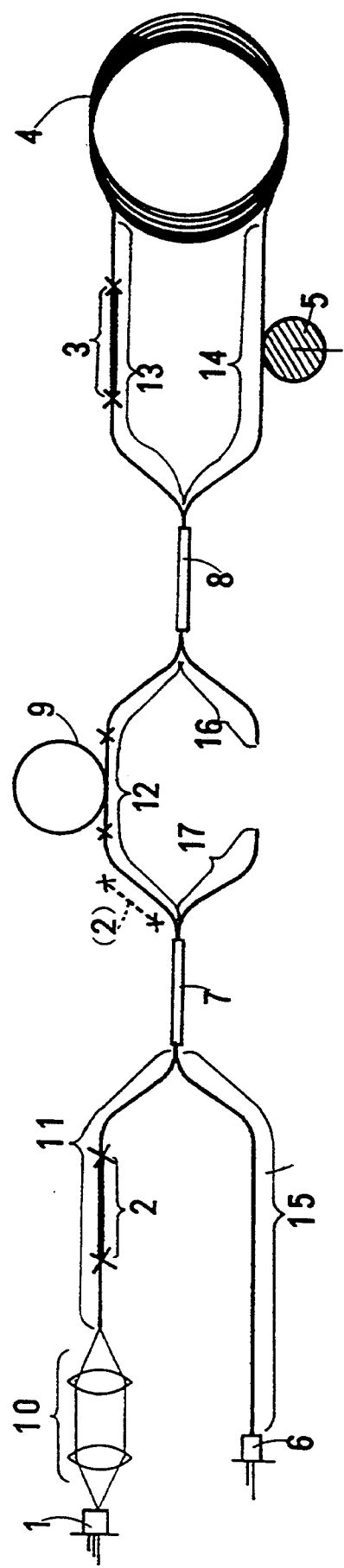
FIG. 1 is a schematical view of a fiber-optic gyroscope as an embodiment of this invention.

FIG. 1 shows an embodiment of the invention. All light paths are constituted by optical fibers; mainly by single mode optical fibers but partially by polarization maintaining optical fibers.

This fiber-optic gyroscope includes a light emitting device (1), depolarizers (2) and (3), a fiber coil (4), a phase modulator (5), a photodetector (6), fiber couplers (7) and (8), a fiber type polarizer and single mode optical fibers connecting the parts together.

Figure 2:
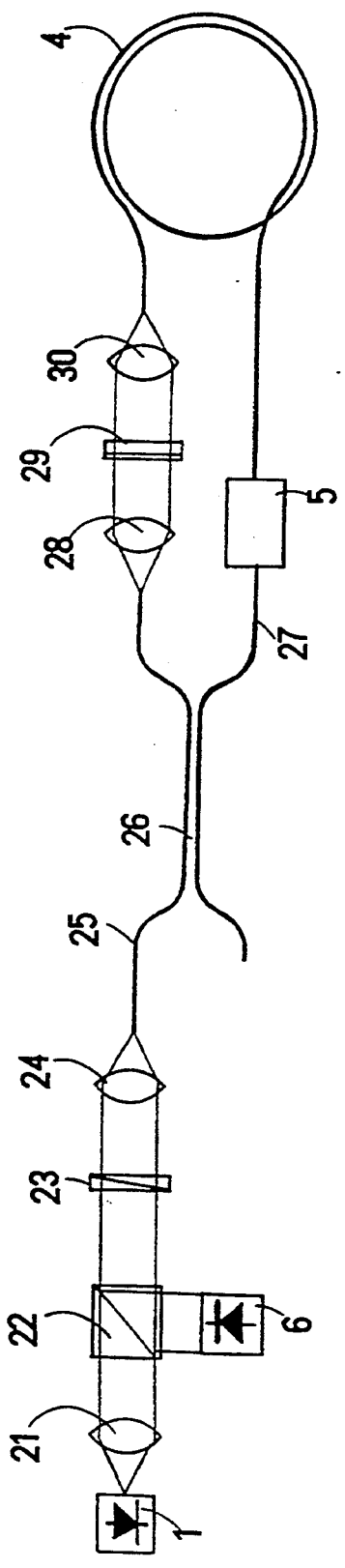
FIG. 2 is a schematical view of a fiber-optic gyroscope proposed by Boehm et al.
Figure 3:
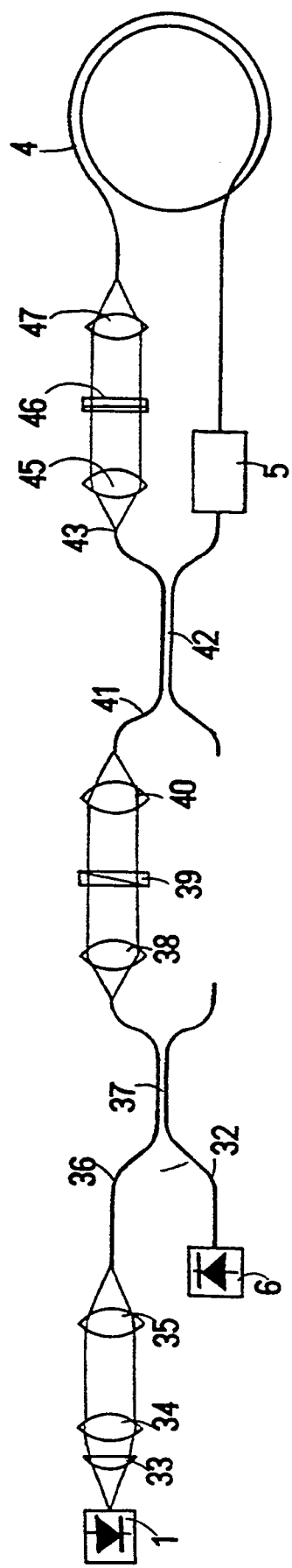
FIG. 3 is a schematical view of another fiber-optic gyroscope proposed by Boehm et al.

A light emitting device (1) is a light source which emits a monochromatic light. A laser diode or a superluminescent diode with a short coherent length can be used for the light source. Depolarizers (2) and (3) are the devices which convert a linearly polarized light into a non-polarized light. The second depolarizer (3) has also been disclosed in the prior art in FIG. 2 or FIG. 3. The necessity of the second depolarizer has been well known as described so far. However, besides the second depolarizer (3), the present invention proposes the first depolarizer (2). This is the novelty of this invention.

Figure 4:
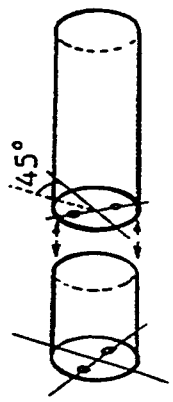
FIG. 4 is a decomposed, perspective view of a depolarizer using polarization maintaining fibers.

In this embodiment, both depolarizers (2) and (3) are made from polarization maintaining fibers. As shown in FIG. 4, two polarization maintaining fibers are axially coupled together with their optical principal axes deviating by 45 degrees each other. The differences for the optical paths of the light with two different polarization planes perpendicular together in the fibers must be longer than the coherent length of the light emitted from the light emitting device. The ratio of the lengths of the fibers is preferably 2:1. As the fibers have 2:1 of the ratio of the length, the shorter fiber should satisfy the inequality.

$$(n_x - n_y)l > h \tag{4}$$

where $n_x$ is a refractive index for the light polarized in x direction, $n_y$ is a refractive index for the light polarized in y direction, $l$ is the fiber length, and $h$ is the coherent length of the light emitting device. "x" and "y" are principal axes of the polarization maintaining fiber. These requirements have been known to the skilled in art and have also been mentioned some times in this description. However, the fiber type depolarizer is now explained in detail, because it has not been well used yet in the state of the art.

It is assumed that a light with the polarization plane deviating by an angle $\phi$ from the principal axis of the fiber has entered the first polarization maintaining optical fiber. This light is divided into two partial lights which have polarization planes parallel to x-direction and y-direction. As the light propagates in the anisotropic fiber, the refractive indexes and the phase velocities are different for two lights. When two partial lights originally being one light go out of the fiber, two lights with the different polarization planes are distanced from each other by the length over which they could not interfere together. This is what inequality (4) means. The amplitudes of the partial lights of x-polarization and y-polarization are denoted by $\cos \phi$ and $\sin \phi$ respectively in the first anisotropic polarization maintaining fiber. Here, the light with the polarization plane parallel with x-direction is simply written as the light of x-polarization.

Passing through an interface, two lights enter the second polarization maintaining fiber which is inclined to the first one at an angle $\Theta$. As the lights are further divided into two, four partial lights propagate in the fiber. The amplitudes of the partial lights of x-polarization are $\cos \phi \cos \Theta - \sin \phi \sin \Theta$. The two lights will not interfere, because they are distanced farther than the coherent length of the light. Thus, the energy $P_x$ of the light, which is defined as the square of the amplitude, of x-polarization is given by, $$P_x = (\cos \phi \cos \Theta)^2 + (\sin \phi \sin \Theta)^2 \tag{5}$$

Since inequality (4) holds also in the second fiber, the cross term of the square vanishes.

Similarly, the amplitudes of the lights of y-polarization are $\cos \phi \sin \Theta$ and $\sin \phi \cos \Theta$. As these lights also separate from each other farther than the coherent length, the cross term also vanishes. The energy $P_y$ of the lights of y-polarization is, $$P_y = (\cos \phi \sin \Theta)^2 + (\sin \phi \cos \Theta)^2 \tag{6}$$

Non-polarized light means the light which includes many partial lights having polarization planes in all directions with the same probability. This condition is equivalent to the equation $P_x=P_y$. In general, the ratio of $P_x/P_y$ depends on the angle $\phi$ of the polarization of the incident light. But only in the case of $\Theta=\pi/4$ (45 degrees), the condition $P_x=P_y$ of non-polarization always holds for arbitrary $\phi$.

Therefore, a depolarizer is produced by connecting two birefringent parts axially with their principal axes inclined at 45 degrees to the other. Birefringent crystals have been used in the Lyot depolarizer. Polarization maintaining fibers can also be used, because they have birefringence.

The reason why the ratio of the thickness or the length should be 1:2 is to forbid the difference of the optical paths, which has once surmounted the coherent length by the first birefringent part, from reducing below the coherent length. If the ratio of the thickness or the length were 1:1, the described lights having amplitudes $\cos\phi\sin\Theta$ and $\sin\phi\cos\Theta$ would lose the difference of the optical paths and would interfere together. The energy of the light of y-polarization would not be written by Eq.(6). The condition of depolarization ($P_x=P_y$) would be broken down. Of course, the ratio need not be rigorously 1:2. Other ratios except for 1:1 are allowed for a depolarizer.

The fiber coil (4) is a coil of a single mode optical fiber wound many times around a bobbin. This acts as a sensor of rotation. The lights propagate in the fiber coil (4) clockwise and counterclockwise.

The phase modulator (5) which will modulate the phase of the propagating lights consists of a cylindrical piezoelectric vibrator around which some part of the optical fiber near one end of the fiber coil are wound. The piezoelectric vibrator has two electrodes either on both ends or on inner and outer surfaces for supplying voltage. When alternating voltage is applied on the electrodes, the piezoelectric vibrator repeatedly shrinks and dilates in the radial direction. Then, the optical fiber around the piezoelectric vibrator also shrinks and dilates periodically. Thus, the phase of the light propagating in the fiber also changes periodically.

A photodetector (6), e.g. a pin photodiode makes the clockwise light and the counterclockwise light interfere together and detects the intensity of the interference light.

Fiber couplers (7) and (8) which divide one light into two or unify two lights to one have been fabricated by peeling the claddings of two optical fibers, contacting them in parallel, melting them and stretching them. In the stretched state, the distance between two cores of the fibers is so narrow that two fibers form an evanescent coupling through which the energy of light is gradually transmitted. The degrees of coupling, distance and length, should be adjusted as half of the light energy will appear at two ends of fibers, when a light enters the other end of a fiber. The fiber coupler is equivalent in function to a beam splitter. But the former is far smaller, lighter than the latter.

The fiber type polarizer consists of a bobbin and a polarization maintaining fiber wound around the bobbin. As the optical path is curved, either of two modes with perpendicular polarization planes is attenuating by dissipating its energy out of the fiber. Thus, another mode of light can pass through the curved path without significant loss. Therefore, the coiled fiber essentially acts as a polarizer.

The optical paths constituted by optical fibers will now be explained. In the embodiment, there are seven fiber paths: the first fiber path to the seventh fiber path. The first fiber path (11) connects the light emitting device (1) with the first fiber coupler (7). This is a single mode fiber. A converging optics (10) is positioned between the light emitting device and an end of the first fiber path (11).

The second fiber path (12) connects the first fiber coupler (7) with the second fiber coupler (8). The third fiber path (13) and the fourth fiber path (14) are ends of the fiber coil (4). Both the fiber paths (13) and (14) are coupled together with an end of the second fiber coupler (8).

The fifth fiber path (15) connects the first fiber coupler (7) with the photodetector (6).

The sixth fiber path (16) is a remainder of fiber of the second fiber coupler (8). This fiber path (16) has a free end. The seventh fiber path (17) is a remainder of the first fiber coupler (7). This also has a free end.

If a beam splitter is replaced by a fiber coupler, a free end of fiber will unavoidably remain.

The fiber type polarizer (9) is furnished in the second fiber path (12) between the first fiber coupler (7) and the second fiber coupler (8). The phase modulator (5) and the second depolarizer (3) should be furnished either in the third fiber path (13) or in the fourth fiber path (14). In this embodiment, they are allocated to different paths. However, they may be otherwise installed in the same path.

The first depolarizer (2) must be furnished between the light emitting device (1) and the fiber type polarizer (9). In the embodiment, the first depolarizer (2) exists midway in the first fiber path (11). But it is allowable to position the first depolarizer (2) (as shown by a dotted line) in the second fiber path (12) between the fiber type polarizer (9) and the first fiber coupler (7). Namely, the first depolarizer (2) can be disposed at any point of optical paths before the fiber type polarizer (9).

The light emitting device (11) emits a linearly polarized light. The first depolarizer (2) converts the light into a depolarized (non-polarized) light. The non-polarized light is inversely converted to a linearly polarized light by the fiber type polarizer (9). Since the light once depolarized is again polarized by the fiber type polarizer (9), an amplitude of the polarized light is constant, irrespective of the direction of the light emitting device. This is an important matter. There is no need to adjust the light emitting device or the fiber type polarizer in the rotational direction around the beam axis. Rotation of the polarization planes occurring spontaneously or inducedly by stress, magnetic field or change of temperature will make no difference on the output signal.

Figure 5:
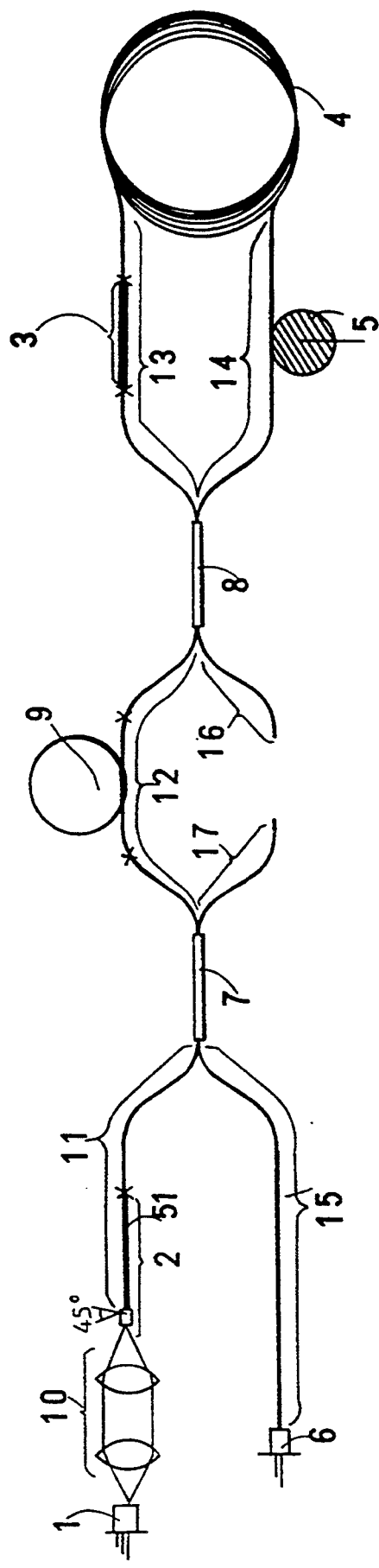
FIG. 5 is a schematical view of a fiber-optic gyroscope as second embodiment of the invention.

FIG. 5 shows another embodiment. The first depolarizer is simplified. The first depolarizer consists only of a polarization maintaining fiber (51) which is connected to a front end of the first fiber path (11). The light emitted from the light emitting device (1) is converged by the converging optics (10) and is introduced to the polarization maintaining fiber (51). The principal axis of the polarization maintaining fiber (51) has been adjusted to be inclined at 45 degrees to the polarization of the light just emitted from the light emitting device (1). Thus, the first polarization maintaining fiber in the foregoing example has been omitted now. Without the first polarization maintaining fiber, the light emitted from the light emitting device (1) is exactly divided into halves. Thus, the light of x-polarization and the light of y-polarization propagate in the fiber with the same amplitude. At the end of the polarization maintaining fiber (51), there are two independent, uninterferable lights having the same amplitude with polarization planes perpendicular to each other. Any light with an arbitrary polarization plane which would be obtained by combining linearly the two independent lights would have exactly the same amplitude, irrespective of the polarization. Thus, this is an ensemble of many lights with polarization planes in all directions with the common probability. Namely, this light is non-polarized. This embodiment has succeeded in omitting one of the polarization maintaining fibers of a depolarizer, making use of the property of the light emitting device (1).

Figure 6:
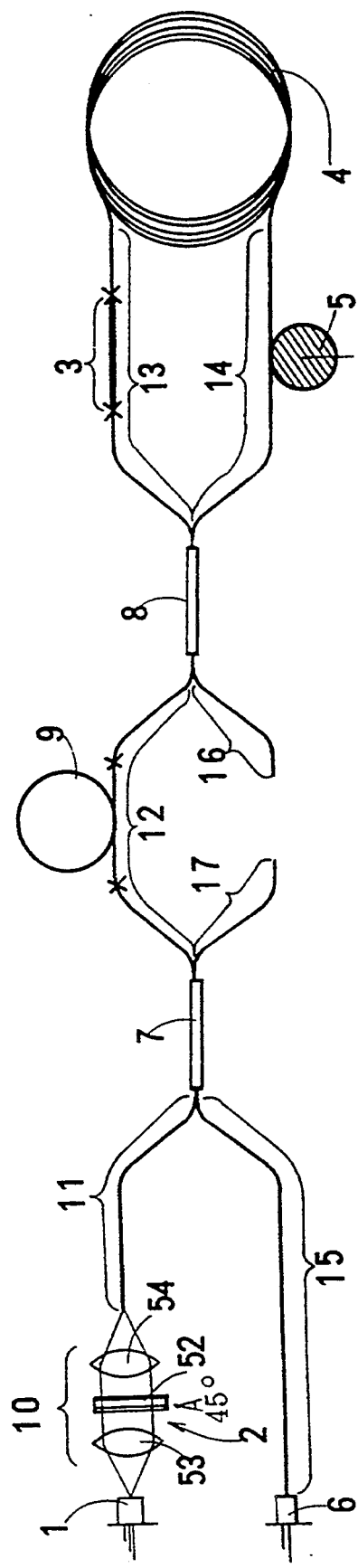
FIG. 6 is a schematical view of a fiber-optic gyroscope as third embodiment of the invention.

FIG. 6 shows another embodiment. Unlike the first and the second embodiment, an ordinary Lyot depolarizer (52) is employed as the first depolarizer. Namely, two birefringent crystals were glued together with their principal axes inclining at 45 degrees to the other. Lenses (53) and (54) are aligned in front of and behind the depolarizer (52). Thus, the converging optics (10) is a little complicated. The light is depolarized by the Lyot depolarizer (52) and enters the first fiber path (11).

Of course, the thickness of the birefringent crystal must satisfy the mentioned requirement that the difference of optical paths between an extraordinary ray and an ordinary ray should be longer than the coherent length of the light emitting device.

What we claim is:

1. A fiber-optic gyroscope for measuring an angular velocity of a fiber coil from a phase difference between a light beam propagating clockwise and a light beam propagating counterclockwise in the fiber coil, comprising:
    a light emitting device for emitting a monochromatic light with a definite coherent length;
    a fiber coil including a single mode optical fiber wound a plurality times around a bobbin;
    a photodetector for making a light propagating clockwise and a light propagating counterclockwise interfere, thereby producing interference light, and for detecting an intensity of the interference light;
    a first fiber path connected to the light emitting device;
    a fifth fiber path connected to the photodetector;
    a third fiber path and a fourth fiber path which are each end parts of the fiber coil;
    a second fiber path;
    a first fiber coupler for coupling one end of the second fiber path to both the first fiber path and the fifth fiber path;
    a second fiber coupler for coupling the other end of the second fiber path to both the third fiber path and the fourth fiber path;
    a polarizer located in the second fiber path for polarizing light linearly;
    a phase modulator furnished in one of the third fiber path and the fourth fiber path for modulating phases of the lights propagating in the fiber path;
    a first depolarizer, consisting of a single birefringent material, furnished in the first fiber path for depolarizing lights propagating in the fiber path by aligning polarization planes of partial lights in all directions so that a probability of one of the partial lights having a given polarization angle is substantially equal to a probability of the one of the partial lights having any other polarization angle;
    a second depolarizer furnished in the third or fourth fiber path for depolarizing lights by aligning polarization planes of partial lights in all directions so that a probability of one of the partial lights having a given polarization angle is substantially equal to a probability of the one of the partial lights having any other polarization angle, wherein the light emitted from the light emitting device is transmitted into the polarizer after being depolarized by the first depolarizer.

2. A fiber-optic gyroscope as claimed in claim 1, wherein the second depolarizer includes two polarization maintaining fibers with principal axes having different lengths coupled to each other and with the principal axes inclining at 45 degrees to one another, wherein in the shorter one of the polarization maintaining fibers, a difference of optical paths between two lights having polarization planes parallel with the principal axes is longer than the coherent length of the light emitting device.

3. A fiber-optic gyroscope as claimed in claim 1, wherein the single birefringent material is a polarization maintaining fiber with principal axes having an end coupled to a beginning end of the first fiber path and having another end facing the light emitting device with the principal axis inclining at 45 degrees to the polarization of the light emitted from the light emitting device, wherein in the polarization maintaining fiber a difference of optical paths between two lights having polarization planes parallel with the principal axes is longer than the coherent length of the light emitting device.

4. A fiber-optic gyroscope as claimed in claim 1, wherein the single birefringent material is a birefringent crystal with principal axes having an end coupled to a beginning end of the first fiber path and another end facing the light emitting device with the principal axes inclining at 45 degrees to the polarization of the light emitted from the light emitting device, wherein in the birefringent crystal a difference of optical paths between two lights having polarization planes parallel with the principal axes is longer than the coherent length of the light emitting device.

5. A fiber-optic gyroscope as claimed in claim 1, wherein the light emitting device is a superluminescent diode.

6. A fiber-optic gyroscope as claimed in claim 1, wherein the light emitting device is a semiconductor laser.

7. A fiber-optic gyroscope as claimed in claim 5, wherein the phase modulator comprises a cylindrical piezoelectric vibrator having electrodes around which the single mode optical fiber of an end of the fiber coil is wound.

8. A fiber-optic gyroscope as claimed in claim 7, wherein the polarizer is a fiber type polarizer having a coiled polarization maintaining fiber in which two lights with different polarization planes have different phase velocities and one of the light, is attenuating by dissipating energy at a curved boundary between a core and a cladding of the coiled polarization maintaining fiber but the other light can propagate therethrough without significant loss.

9. A fiber-optic gyroscope as claimed in claim 6, wherein the phase modulator comprises a cylindrical piezoelectric vibrator having electrodes around which the single mode optical fiber of an end of the fiber coil is wound.

10. A fiber-optic gyroscope as claimed in claim 9, wherein the polarizer is a fiber type polarizer having a coiled polarization maintaining fiber in which two lights with different polarization planes have different phase velocities and one of the light is attenuated by dissipating energy at a curved boundary between a core and a cladding of the coiled polarization maintaining fiber but the other light can propagate therethrough without significant loss.

* * * * *